US005078373A

United States Patent [19]

Miller

[11] Patent Number: 5,078,373

[45] Date of Patent: Jan. 7, 1992

[54] BENCH SAW FENCE

[75] Inventor: David Miller, Tupelo, Miss.

[73] Assignee: Delta International Machinery Corporation, Pittsburgh, Pa.

[21] Appl. No.: 473,581

[22] Filed: Feb. 1, 1990

[51] Int. Cl.[5] .......... B23Q 3/02

[52] U.S. Cl. .......... 269/303

[58] Field of Search .......... 269/303-307, 269/315-320; 144/253 R; 83/438, 444

[56] References Cited

U.S. PATENT DOCUMENTS 2,771,103 11/1956 Odum et al. .......... 83/438
3,011,531 12/1961 Gaskell .......... 83/438
4,558,618 12/1985 Bachmann et al. .......... 269/303
4,600,184 7/1986 Ashworth .......... 269/303
4,846,036 7/1989 Metzger et al. .......... 83/438

*Primary Examiner*—Robert C. Watson

*Attorney, Agent, or Firm*—Merchant, Gould, Smith, Edell, Welter & Schmidt

[57] ABSTRACT

A highly accurate yet inexpensive bench saw fence which includes (i) a conduit with a featureless distal end for guiding a workpiece along a bench saw table, (ii) a clamping mechanism proximate the distal end of the conduit for clamping the fence to a bench saw table which includes a linear alignment ridge for guiding the bench saw table into proper contact with the clamping mechanism and ensuring proper alignment of the fence with respect to the bench saw table, and (iii) a rotatable control lever proximate the proximal end of the conduit in mechanical communication with the clamping mechanism for controlling movement of the clamping mechanism between a release position and a clamping position and by movement of the lever from a primary locking position to a secondary locking position, (iv) wherein rotation of the control lever causes concentric rotation of the path between the primary and secondary locking positions.

3 Claims, 3 Drawing Sheets

BENCH SAW FENCE

FIELD OF THE INVENTION

Broadly, the invention relates to bench saw fences. Specifically, the invention relates to rear locking bench saw fences.

BACKGROUND OF THE INVENTION

A multiplicity of bench saw fences for use with a variety of different bench saw tables have been designed and marketed over the years. These bench saw fences typically include an elongated conduit which provides the linear guiding surface, a coupling mechanism proximate the proximal end of the conduit for slidably engaging a front rail on the bench saw, a clamping mechanism proximate the distal end of the conduit for clamping the fence to the bench saw table, and a control mechanism proximate the proximal end of the conduit in communication with the clamping mechanism for directing movement of the clamping mechanism between a release position and a clamping position.

The clamping mechanism generally relies upon features in the conduit (apertures, grooves, notches, etc.) for proper functioning. As a result, the conduit is typically fabricated from flat stock, in order to facilitate machining of the necessary features. Unfortunately, fabrication of the conduit from flat stock also facilitates the creation of faults, flaws, and errors in the conduit which can affect the accuracy of the fence.

The control mechanism typically comprises a control dial or lever which moves the clamping mechanism between a release position and a clamping position by rotation of the dial or linear movement of the lever locking positions. These conventional control systems are generally adequate for providing the desired clamping control. However, the dial-type control systems do not provide a readily observable visual indication of the clamping mechanism position and permit the clamping mechanism to reside at an ineffectual intermediate position between the release and clamping positions, while operation of the lever-type control systems can be hindered by an external obstacle because of the need to move the lever between a single released locking position and a single clamped locking position through a single pathway.

Accordingly, a substantial need exists for (i) a highly accurate bench saw fence which can be manufactured at a reasonable cost, and (ii) a bench saw fence which provides multiple locking positions and multiple pathways through which the controlling lever may pass between a released locking position and a clamped locking position.

SUMMARY OF THE INVENTION

Figure 1:
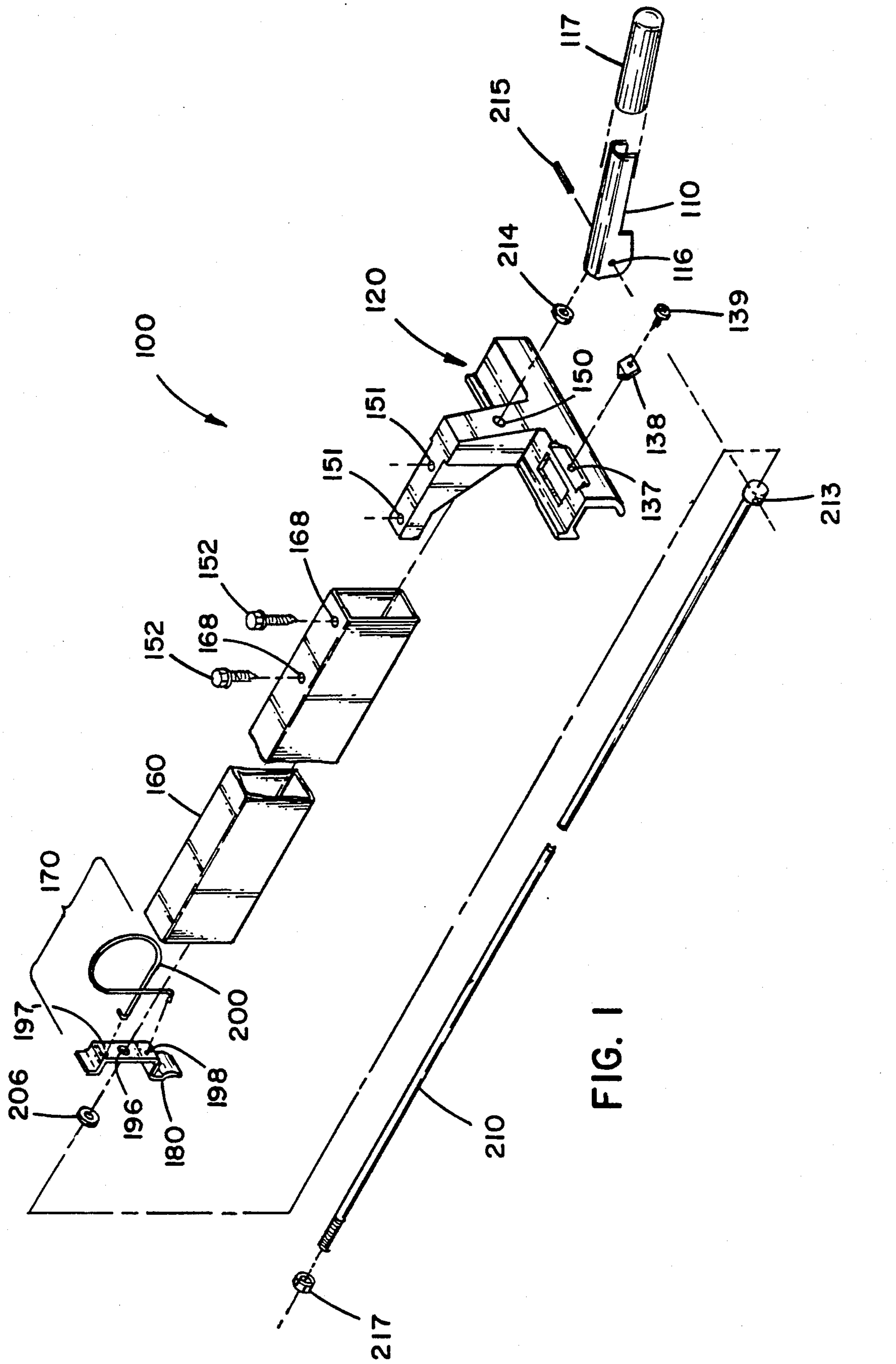
FIG. 1 is an exploded perspective view of one embodiment of the invention.

A first aspect of the invention is a highly accurate yet inexpensive bench saw fence which includes (i) a conduit with a featureless distal end for guiding a workpiece along a bench saw table, (ii) a clamping mechanism proximate the distal end of the conduit for clamping the fence to a bench saw table, and (iii) a controlling lever proximate the proximal end of the conduit in mechanical communication with the clamping mechanism for controlling movement of the clamping mechanism between a release position and a clamping position.

A second aspect of the invention is a bench saw fence which includes (i) a clamping mechanism, and (ii) a control lever in mechanical communication with the clamping mechanism which is effective for controlling movement of the clamping mechanism between a release position and a clamping position by movement of the lever from a primary locking position to a secondary locking position, (iii) wherein the control lever has two secondary locking positions which are substantially diametrically opposed about the primary locking position.

A third aspect of the invention is a bench saw fence which includes a clamping plate with a linear alignment ridge along the distal end for providing proper alignment of the fence with respect to the cutting blade on the bench saw.

DEFINITIONS

As utilized herein, including the claims, the phrase "fully rotatable" refers to the ability to revolve 360° about an axis.

As utilized herein, including the claims, the term "featureless" means having a common configuration without any atypical characteristics such as apertures or grooves which are not uniform and continuous throughout the configuration.

NOMENCLATURE

100 fence
110 lever
111 arm
112 head
113 top of head
114 front of head
115 interconnecting curved surface
116 aperture through head of lever
117 sleeve
120 main body
130 channel portion of main body
131 rest plate
132 abutment plate
**132*d*** distal end of abutment plate
133 alignment extensions
134 inner surface of alignment extensions
135 passage
136 position indicator window
137 threaded aperture proximate position indicator window
138 position indicator needle
139 screw connecting indicator needle and main body
140 connection portion of main body
141 top of connection portion
142 bottom of connection portion
143 proximal end of connection portion 144 distal end of connection portion
145 first side of connection portion
146 first side flange
147 second side of connection portion
148 second side flange
150 axial aperture through connection portion
151 threaded apertures in top of main body
152 screws for connecting conduit to main body
160 conduit
161 top of conduit
162 bottom of conduit
163 right side of conduit
164 left side of conduit
165 proximal end of conduit
166 distal end of conduit
167 enclosed channel defined by conduit
168 apertures through the top of the conduit
170 clamping mechanism
180 clamping plate
181 top of clamping plate
182 bottom of clamping plate
183 first side of clamping plate
184 second side of clamping plate
185 front of clamping plate
186 rear of clamping plate
190 main body of clamping plate
191 first extension plate
192 pivot flange
193 second extension plate
194 abutment tab
195 alignment ridge
196 central aperture through clamping plate
197 first aperture through clamping plate
198 second aperture through clamping plate
200 spring
201 first distal end
202 second distal end
210 connecting rod
211 proximal end of connecting rod
212 distal end of connecting rod
213 aperture through proximal end of connecting rod
214 washer for proximal end of connecting rod
215 pin for connecting lever and connecting rod
216 washer for distal end of connecting rod
217 nut for distal end of connecting rod

DETAILED DESCRIPTION OF THE INVENTION INCLUDING A BEST MODE

Broadly, the bench saw fence 100 includes (i) an elongated conduit 160, (ii) a clamping mechanism 170 proximate the distal end 166 of the conduit 160, (iii) a main body 120 having a channel portion 130 for slidably engaging the front rail [not shown] of a bench saw [not shown] and a connection portion 140 for coupling the main body 120 to the proximal end 165 of the conduit 160, (iv) a control lever 110 extending from the proximal end 143 of the connection portion 140 of the main body 120, and (v) a connecting rod 210 interconnecting the lever 110 and the clamping mechanism 170.

The conduit 160 is a length of rectangular structural steel tubing having a planar top surface 161, a planar bottom surface 162, a planar right side 163, a planar left side 164, a proximal end 165, and a distal end 166. The right side 163 and left side 164 provide a planer surface for guiding a workpiece [not shown] along the bench saw table [not shown]. The conduit 160 defines an internal enclosed channel 167 which extends continuously from the proximal end 165 to the distal end 166 of the conduit 160.

The main body 120 is coupled to the proximal end 165 of the conduit 160 by a pair of bolts 152. Each bolt 152 pass through an aperture 168 in the top surface 161 of the conduit 160 and is threadably inserted into an aperture 151 in the top surface 141 of the connection portion 140 of the main body 120 which extends into the channel 167 defined by the conduit 160. First and second side flanges 146,148 are provided along the first and second sides 145,146 of the connection portion 140 of the main body 120 for stabilizing coupling of the conduit 160 and the main body 120 and assisting in aligning the aperture 168 in the conduit 160 and the apertures 151 in the connection portion 140 of the main body 120.

The main body 120 is comprised of a channel portion 130 which basically extends left to right with respect to the conduit 160 and a connection portion 140 which basically extends front to back with respect to the conduit 160. The channel portion 130 includes a rest plate 131, an abutment plate 132, and alignment extensions 133 which define a downwardly open passage 135 extending left to right with respect to the conduit 160. The inner surface 134 of the alignment extensions 133 and the distal end **132*d* of the abutment plate 132 are sloped in order to facilitate insertion of the front guide rail [not shown] of a bench saw [not shown] into the passage 135**.

The connection portion 140 extends substantially transverse to the channel portion 130 and facilitates connection of the main body 120 to the conduit 160. The connection portion 140 includes a top 141, a bottom 142, a proximal end 143, a distal end 144, a first side 145, and a second side 147. As mentioned previously, the connection portion 140 includes a pair of threaded apertures 151 in the top surface 141 which align with a pair of apertures 168 through the top surface 161 of the conduit 160.

A position indicator window 136 is provided through the rest plate 131 for viewing a scale [not shown] which is commonly provided on the front guide rail [not shown] of bench saw tables [not shown] and indicates distance from the blade [not shown]. A position indicator needle 138 is coupled to the main body 120 proximate the indicator window 136 by means of a screw 139 which is threadably inserted into aperture 137 in the main body 120. The position indicator needle 138 indicates the size of the gap provided between the fence 100 and the blade [not shown]. Obviously, the position indicator needle 138 and the scale [not shown] must be properly correlated to provide meaningful information.

A clamping mechanism 170 consisting of a clamping plate 180 and a spring 200 is located at the distal end 166 of the conduit 160. The clamping plate 180 is a rectangular plate having a top edge 181, a bottom edge 182, a first side 183, a second side 184, a front surface 185 and a rear surface 186. The clamping plate 180 defines a main body 190, an offset upper pivot flange 192 extending substantially parallel with the main body 190, and an offset lower abutment tab 194 extending substantially parallel with the main body 190. The pivot flange 192 and abutment tab 194 are offset from the main body 190 by extension plates 191 and 193 respectively. The pivot flange 192 contacts the distal end 166 of the top 161 of the conduit 160 and provides a pivot point about which the clamping plate 180 may be pivoted. The main body 190 of the clamping plate 180 is configured to fit within the channel 167 defined by the conduit 160 with sufficient clearance to allow pivoting of the clamping plate

180 about the pivot flange 192. The abutment tab 194 is offset from the main body 190 further than the pivot flange 192 so that pivoting of the abutment tab 194 is not impeded by the distal end 166 of the bottom 162 of the conduit 160.

The spring 200 portion of the clamping mechanism 170 is a single loop spring configured to fit within the channel 167 defined by the conduit 160. The first distal end 201 of the spring 200 is coupled to the clamping plate 180 proximate the pivot flange 192 while the second distal end 202 of the spring 200 is coupled to the clamping plate 180 proximate the abutment tab 194. The spring 200 is coupled to the clamping plate 180 by passing the first end 201 of the spring 200 through the first aperture 197 in the clamping plate 180 which is proximate the pivot flange 192, passing the second end 202 of the spring 200 through the second aperture 198 in the clamping plate 180 which is proximate the abutment tab 194 and then bending the distal ends 201,202 of the spring 200 to prevent the ends 201,202 from returning through the apertures 197,198. The spring 200 pivotally biases the clamping plate 180 away from the conduit 160 towards the extended release position.

Movement of the clamping mechanism 170 is directed by a control lever 110 which abuts the proximal end 143 of the connection portion 140 of the main body 120. The control lever 110 is operably connected to the clamping plate 180 by a connecting rod 210 which passes through an axial aperture 150 in the main body 120 and the enclosed channel 167 defined by the conduit 160. The proximal end 211 of the connecting rod 210 is coupled to the head 112 of the lever 110 by means of a roll pin 215 which passes through an aperture 116 in the head 112 of the lever 110 and an aperture 213 in the proximal end 211 of the connecting rod 210. The distal end 212 of the connecting rod 210 passes through a central aperture 196 in the clamping plate 180 and is threadably engaged by a combination nut 217 and washer 216 which are tightened against the force of the spring 200 until the pivot flange 192 is placed in constant contact with the top 161 of the distal end 166 of the conduit 160 and the abutment tab 194 is provided with a longitudinal range of motion.

Figure 3:
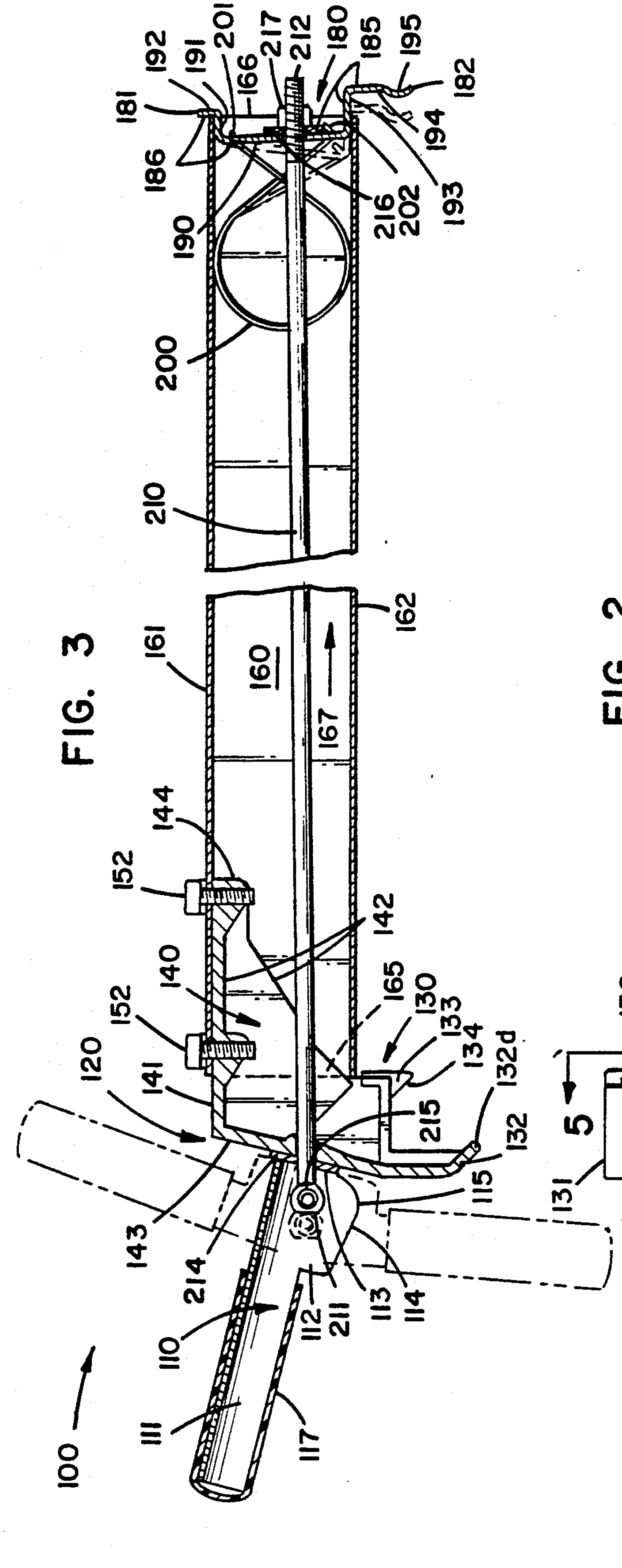
FIG. 3 is a cross-sectional side view of the invention as depicted in FIG. 2 taken along line 3—3 which depicts both the extended release position and the contracted clamping position of the control lever and clamping mechanism.
Figure 2:
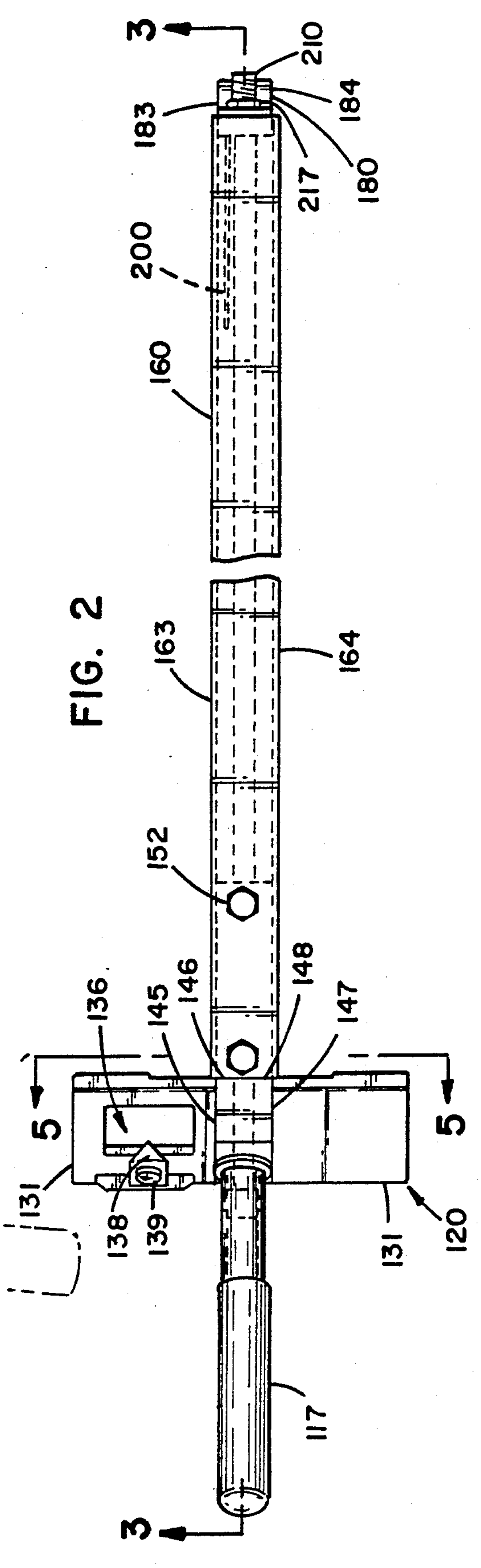
FIG. 2 is a top view of the invention as depicted in FIG. 1 (Assembled).
Figure 4:
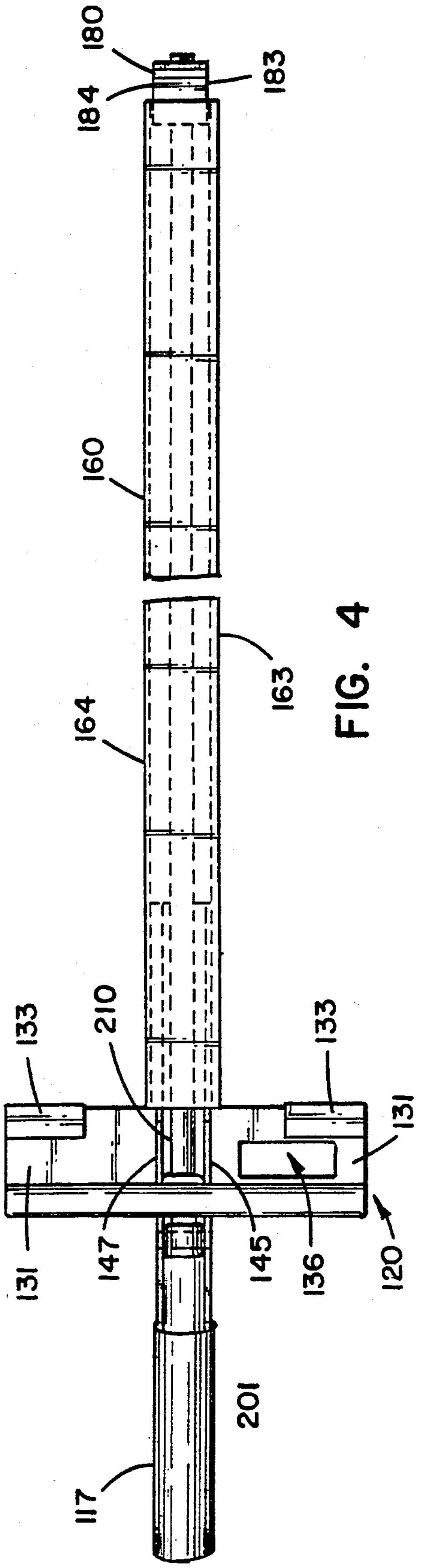
FIG. 4 is a bottom view of the invention as depicted in FIG. 2.
Figure 5:
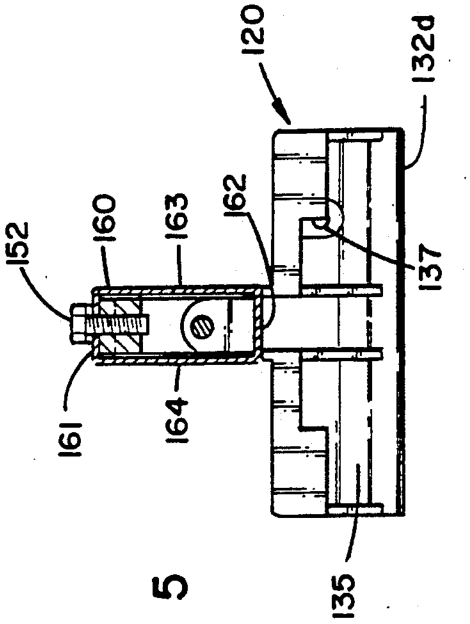
FIG. 5 is a cross-sectional front view of the invention as depicted in FIG. 2 taken along line 5—5.

The lever 110 includes an arm portion 111 encased within a sleeve 117 and a head portion 112 with a flat top surface 113 and a flat front surface 114 which are interconnected by a curved surface 115. A washer 214 is placed between the lever 110 and the proximal end 143 of the connection portion 140 of the main body 120 in order to provide a durable and easily replaceable wear surface against which the lever 110 may slide. The aperture 116 in the head 112 of the lever 110 is not equally spaced from the top 113 and front 114 surfaces so that movement of the lever 110 between a first locked position with the top surface 113 contacting the washer 214 and a second locked position with the front surface 114 contacting the washer 214 causes longitudinal movement of the connecting rod 210 between an extended position and a retracted position and thereby causes the clamping plate 180 to pivot about the pivot flange 192 between a release position and a clamping position. The position of the control lever 110 as between the release position and the clamping position provides an obvious visual indication of the current condition of the fence 100 (released or clamped). Referring to FIG. 3, the aperture 116 in the head 112 of the lever 110 is spaced closer to the top surface 113 than the front 114 surface such that placement of the lever 110 in a first locked position with the top surface 113 contacting the washer 214 places the connecting rod 210 in the extended position and the clamping plate 180 in the release position [shown in solid lines] while placement of the lever 110 in a second locked position with the front surface 114 contacting the washer 214 places the connecting rod 210 in the retracted position and the clamping plate 180 in the clamping position [shown in phantom]. If desired, the spacing of the aperture 116 from the top 113 and front 114 surfaces can be switched so as to cause the clamping plate 180 to be in the release position when the front surface 114 abuts the washer 214 and to be in the clamping position when the top surface 113 abuts the washer 214.

The extent of the difference in the distance between the aperture 116 and the top surface 113 and the aperture 116 and the front surface 114 dictates the extent to which the clamping plate 180 pivots. Hence, certain aspects of the clamping mechanism 170 configuration are dictated by the positioning of the aperture 116 in the head 112 of the lever 110. For example, the second extension plate 193 must offset the abutment tab 194 a sufficient distance to prevent the conduit 160 from contacting the abutment tab 194 and interfering with movement of the clamping plate 180.

The connections between the lever 110, connecting rod 210 and clamping plate 180 permits 360° rotation of the lever 110 about the point of connection between the lever 110 and the connecting rod 210 such that the path between the first locked position with the top surface 113 in contact with the washer 214 and the second locked position with the front surface 114 of the lever 110 in contact with the washer 214 may also be rotated about the connection point.

The curved nature of the interconnecting surface 115 on the lever 110 permits the biasing affect of the spring 200 upon the clamping plate 180 to compel the clamping plate 180 and the lever 110 into the release position unless the lever 110 is in the clamped locking position.

The abutment tab 194 includes a convex alignment ridge 195 extending along the bottom edge 182 of the clamping plate 180 for guiding the rear edge [not shown] of a bench saw table [not shown] against the abutment tab 194 and insuring proper alignment of the fence 100 with respect to the bench saw blade [not shown].

Use of the fence 100 includes the steps of (i) guiding the back edge [not shown] of a bench saw table [not shown] into contact with the rear surface 186 of the abutment tab 194 using the alignment ridge 195 to ensure proper orientation, (ii) guiding the front guide rail [not shown] of the bench saw [not shown] into the passage 135 while maintaining contact between the rear edge of the bench saw table and the abutment tab 194, (iii) sliding the fence 100 along the front guide rail until the position indicator needle 138 indicates the desired distance from the bench saw blade [not shown] on the scale [not shown] provided on the front rail guide, (iv) optionally rotating the lever 110 to achieve the most convenient path between the released locking position and the clamped locking position, and then (v) clamping the fence 100 into position by moving the lever 110 from the released locking position [top surface 113 abutting washer 214] to the clamped locking position [front surface 114 abutting washer 214].

The specification is presented to aid in complete non-limiting understanding of the invention. Since many variations and embodiments of the invention can be made without departing from spirit and scope of the invention, the invention resides in the claims hereafter appended.

I claim:

1. A bench saw fence, comprising:

(a) a conduit having a proximal end and a distal end, the conduit defining an enclosed channel, the channel having first and second opposed inner surfaces;

(b) a clamping mechanism proximate the distal end of the conduit which includes a clamping plate, the clamping plate further comprising:

(i) a main body, the main body being formed as a substantially planar member;

(ii) a spring, the spring being formed as a loop configured to fit within the conduit channel, the spring abutting the first and second opposed inner surfaces of the channel, the spring having a first distal end and a second distal end;

(iii) a first extension plate, the first extension plate being integrally formed with the clamping plate;

(iv) a second extension plate, the second extension plate being integrally formed with the clamping plate;

(v) a pivot flange, the pivot flange being formed integrally with the first extension plate so as to form a first surface substantially parallel to the main body; and (vi) an abutment tab, the abutment tab being integrally formed with the second extension plate so as to form a second surface substantially parallel to the main body; and (c) a control lever proximate the proximal end of the conduit in mechanical communication with the clamping plate for controlling movement of the plate between a release position and a clamping position.

2. The fence of claim 1 wherein the control lever is fully rotatable such that movement of the lever between a first position which places the clamping plate in the release position and a second position which places the clamping plate in the clamping position may be effected along substantially any radius of a circle defined by rotation of the lever.

3. The fence of claim 1 wherein the control lever moves the clamping plate between a clamping position and a release position by pivoting the plate about the first distal end of the plate.

* * * * *